US006295880B1

(12) United States Patent
Gilson

(10) Patent No.: US 6,295,880 B1
(45) Date of Patent: Oct. 2, 2001

(54) ADJUSTABLE PIPETTE

(76) Inventor: Warren E. Gilson, 601 N. Segoe, Unit 104, Madison, WI (US) 53705

(*) Notice: Subject to any disclaimer, the term of this patent is extended or adjusted under 35 U.S.C. 154(b) by 0 days.

(21) Appl. No.: 09/456,610

(22) Filed: Dec. 8, 1999

(51) Int. Cl.[7] ....................................................... G01N 1/00
(52) U.S. Cl. ........................................................... 73/864.18
(58) Field of Search .............................. 73/864.13, 864.1, 73/864.18; 422/100; 222/209

(56) References Cited

U.S. PATENT DOCUMENTS 3,492,876 * 2/1970 Bull et al. .
3,506,164 4/1970 Weichselbaum et al. .
3,766,784 10/1973 Walker .
3,827,305 8/1974 Gilson et al. .
4,117,728 10/1978 Johnson .
4,263,257 * 4/1981 Metsala ............................. 73/864.18
4,435,989 3/1984 Meyer et al. .
5,104,624 * 4/1992 Labriola ............................ 73/864.18

* cited by examiner

*Primary Examiner*—Robert Raevis
(74) *Attorney, Agent, or Firm*—Mason, Kolehmainen, Rathburn & Wyss; Philip M. Kolehmainen

(57) ABSTRACT

An adjustable pipette includes a body containing a plunger assembly including a thumb button that is axially moved in alternating relatively shorter sample aspirating and relatively longer dispensing strokes. Guide slots in a guide sleeve receive a stop pin carried by a plunger shaft, and the slots define two axially and circumferentially spaced lower stops for aspirating and dispensing strokes respectively. The thumb button includes offset lobes that apply a rotational torque to the plunger shaft when pressed by the user. The user presses one lobe for an aspirating stroke to rotate the plunger shaft in one direction and align the stop pin with uppermost lower stops for a relatively short aspirating stroke and the user presses the other lobe for a dispensing stroke to rotate the plunger shaft in the other direction and align the stop pin with lowermost lower stops for a relatively long dispensing stroke. A window in the body permits the user to view and thereby understand the function of the lower stop selecting mechanism.

11 Claims, 3 Drawing Sheets

ADJUSTABLE PIPETTE

FIELD OF THE INVENTION

The present invention relates to pipettes, and more particularly to an adjustable pipette having an improved stop arrangement for sample aspirating and dispensing strokes of different lengths.

DESCRIPTION OF THE PRIOR ART

Pipettes are used for transferring liquid samples having a precisely measured volume. A piston assembly is moved in an aspirating stroke, first down into a pipette body and then up to draw or aspirate a sample into a sample receiving region, such as a disposable tip. Then the piston assembly is again moved down in a dispensing stroke to dispense the sample from the sample receiving region. It is desirable that the piston travel farther in the downward direction during the dispensing stroke than during the intake stroke so that the resulting overtravel positively expels the entire sample.

U.S. Pat. No. 3,827,305 discloses a pipette typical in many respects of the prior art. A main spring biases the piston in the upward direction, and the user overcomes the force of this spring when moving the piston down. An overtravel spring biases a lower stop to a normal position where it limits downward travel of the piston during the intake, aspiration stroke. During the discharge or dispensing stroke, the user forces the piston to overtravel by overcoming the force of the overtravel spring as well as the main spring so that the lower stop is moved down from its normal position.

This known lower stop arrangement requires skill and strength. During the aspirating stroke the user must move the piston down all the way to the lower stop to assure that a full sample is drawn up. But the user must not move the piston beyond its initial contact with the lower stop, or else the aspirated sample is too large. A user therefore must detect by feel the proper downward limit of the aspiration stroke.

Typically the overtravel spring is stronger than the main spring. A stiff overtravel spring aids the user in detecting contact of the piston against the lower stop without moving the lower stop during the aspiration stroke. In pipettes where the overtravel spring serves an additional function of applying force to a lower seal, a stiff spring also increases the sealing effect. The use of a strong overtravel spring requires the user to apply a relatively large force during the dispensing stroke to overcome the overtravel spring force and move the lower stop.

U.S. Pat. Nos. 3,506,164; 3,766,784 and 4,435,989 disclose pipettes having indexing mechanisms with rotatable members responsive to piston movement for alternately limiting downward motion with spaced lower stops to achieve relatively shorter and longer aspiration and dispensing strokes respectively. The alternate action is automatic, with no user input other than repetitive, purely axial piston operation. Although these devices eliminate the need for the user to overcome a large spring force for overtravel movement, they are undesirably complicated, expensive and delicate. In addition, the automatic alternate selection by the internal mechanism of either an aspiration or a dispensing stroke can lead to inadvertent interchange of the strokes and resulting error.

U.S. Pat. No. 4,117,728 discloses a pipette with cooperable plunger and casing shoulder means for regulating relative movement of the pipette plunger and casing to permit the sequential and separate pickup of different liquids, the mixing of the liquids, and the dispensing of the mixed liquids. This pipette does not a provide a mechanism for achieving a dispensing stroke that is essentially longer than the aspirating stroke.

SUMMARY OF THE INVENTION

A principal object of the present invention is to provide an adjustable pipette having an improved lower stop arrangement for providing sample aspirating and dispensing strokes of different lengths. Other objects of the invention are to provide a pipette in which an increased dispensing stroke length is achieved without requiring great operator skill or strength; to provide a pipette in which the thumb button is shaped to facilitate rotation of the plunger assembly to alternate positions corresponding to different aspirating and discharging plunger strokes; to provide a pipette permitting the user to see the mechanism that provides either an aspirating or discharging stroke; to provide a pipette with positive, solid stops at the bottom of both the aspirating and dispensing strokes; to provide a pipette eliminating the necessity for the user to compress a heavy spring or to compress more than one spring while performing aspirating and dispensing operations; to provide a pipette wherein the need for a single repeated user thumb movement is avoided; and to provide an improved pipette overcoming disadvantages of known adjustable pipettes.

In brief, in accordance with the invention there is provided a pipette for aspirating and dispensing liquid samples. The pipette includes an elongated body having a longitudinal axis, the body having an upper handle portion and a lower portion. The body defines a cylinder communicating with the lower portion. A plunger assembly moves axially in the body and includes a piston movable axially in the cylinder away from the lower portion to aspirate a liquid sample and toward the lower portion to dispense a liquid sample. An upper stop engages the plunger assembly and defines an upper position. First and second lower stops engage the plunger assembly and define first and second discrete lower positions of the piston assembly The first and second lower stops are spaced apart axially and circumferentially relative to the axis. A return spring connected between the body and the plunger assembly biases the plunger assembly upward toward the upper position. The plunger assembly includes an axially extending operating shaft for moving the plunger assembly downward to one of the lower positions. The plunger assembly includes a radially extending and rotatably mounted lower stop engaging portion, the stop engaging portion being rotatable in a first direction for engagement with the first lower stop to define a relatively shorter aspiration stroke of the plunger assembly, and the stop engaging portion being rotatable in a second direction for engagement with the second lower stop to define a relatively longer dispensing stroke of the plunger assembly.

BRIEF DESCRIPTION OF THE DRAWING

The present invention together with the above and other objects and advantages may best be understood from the following detailed description of the preferred embodiment of the invention illustrated in the drawings, wherein.

DETAILED DESCRIPTION OF THE PREFERRED EMBODIMENTS

Figure 7:
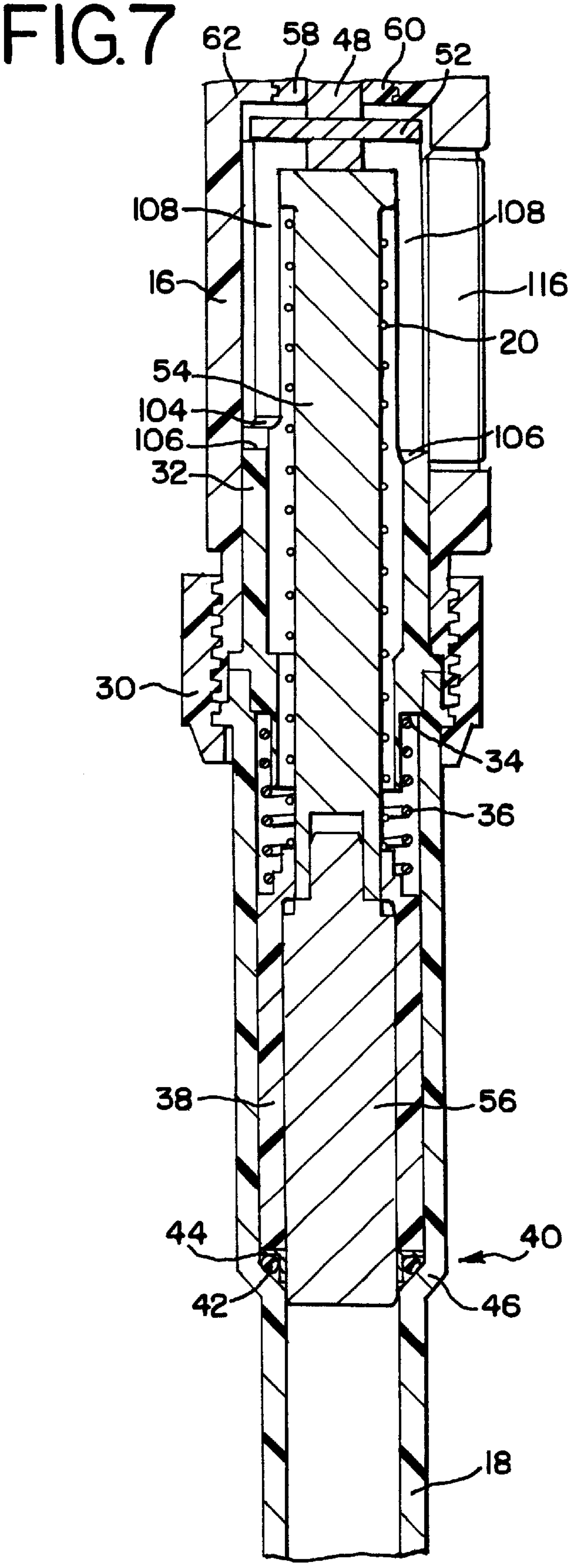
FIG. 7 is an enlarged, fragmentary sectional view of the pipette corresponding to a portion of FIG. 4.

Having reference now to the drawings, there is illustrated an adjustable pipette constructed in accordance with the principles of the present invention and designated as a whole by the reference character 10. In general the pipette 10 includes an elongated body 12 and a plunger assembly 14 axially movable within the body. The body 12 includes an upper handle portion 16 and a lower body portion 18. The plunger assembly 14 is biased upward by a plunger spring 20 (FIGS. 5 and 7) and is moved downward by a thumb button 22. A removable and disposable tip 24 (FIG. 4) is frictionally carried by the lower body portion 18. The user depresses the plunger assembly 14 to a first lower stop position and then places the tip 24 into a container of liquid sample material. Then the user permits the spring 20 to raise the plunger assembly 14 in order to aspirate a liquid sample into the tip 24. The user then depresses the plunger assembly 14 again, this time to a second stop position lower than the first stop position. This dispenses the liquid sample, and because the second stop position is lower than the first stop position, the dispensing stroke is longer than the aspirating stroke. The resulting overtravel provides a blast of air following dispensing of the sample and assures that the sample is completely dispensed. After use, the tip 24 is usually removed and replaced with a new tip 24.

The handle portion 16 is shaped so that it fits comfortably in the hand of the user. A lip 26 extends forward from the front of the top of the handle portion 16. The lip 26 includes a downwardly sloping surface 28 that embraces the forefinger of a user. When the user presses the thumb button 22, the lip 26 applies the reaction force to the forefinger of the user. The downwardly sloped surface 28 makes it easy for the user to hold and control the pipette 10, and makes it possible to suspend the pipette from the fingers alone.

The lower body portion 18 is attached to the lower end of the handle portion 16 by a nut 30. The nut 30 captures a guide sleeve 32 within the handle portion 16. A shoulder 34 of the sleeve 32 engages the upper end of a seal loading spring 36. The lower end of the spring 36 bears against a cylinder sleeve 38 slideably supported in the lower body portion 18. The lower end of the cylinder sleeve 38 engages a seal assembly 40 including an O-ring seal 42 and a flanged seal support washer 44. The O-ring seal is loaded with a constant spring force supplied by the spring 36 against a conical wall portion 46 of the lower body portion 18 to provide an airtight seal of the interior of the lower body portion 18.

The plunger assembly 14 includes a plunger shaft 48 with its upper end projecting above the handle portion 16. The thumb button 22 is fixed by a set screw 50 (FIG. 4) to the top of the plunger shaft 48. A transverse pin 52 is fixed into the lower end of the plunger shaft 48 and serves as a radially extending stop engaging member. The bottom end of the plunger shaft 48 engages the top of a spacer shaft 54, and the bottom of the spacer shaft 54 mates with a plunger piston 56 that is slidable axially in the cylinder sleeve 38. Upward movement of the piston 56 in the cylinder 38 reduces pressure within the tip 24. The reduced pressure is employed for aspiration of a liquid sample. Downward movement of the piston 56 in the cylinder 38 increases pressure within the tip 24. The increased pressure is employed for dispensing of a liquid sample.

Figure 6:
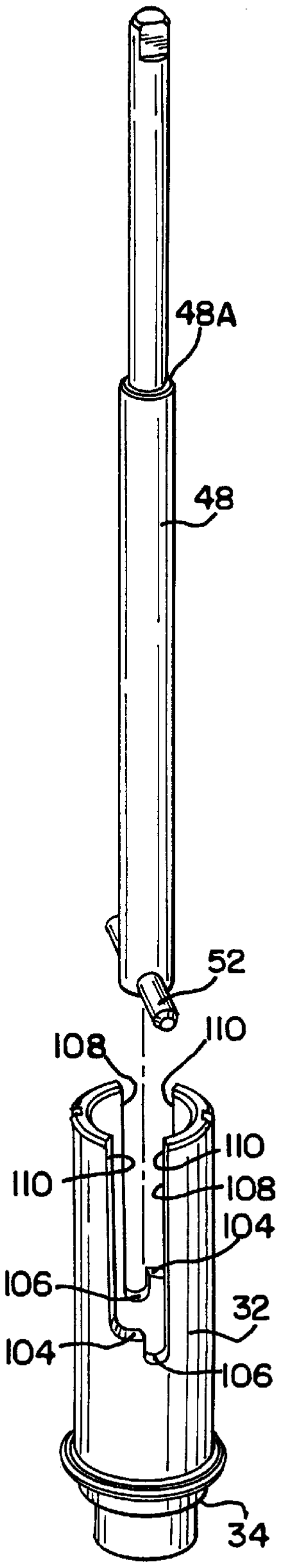
FIG. 6 is an exploded isometric view of the operating shaft and guide sleeve of the pipette.

Sample size is adjustable by axially positioning an upper stop member 58 including a threaded shaft section 60 received in a fixed, threaded body nut portion 62. Upward motion of the plunger assembly 14 is limited by engagement of an upwardly directed shoulder 48A (FIG. 6) of the plunger shaft 48 against a stop surface 63 (FIG. 4) formed on the stop member 58. The upper stop member 58 is seen in its uppermost position in FIGS. 4 and 7. In this position a liquid sample of a maximum size is aspirated. The upper stop member 58 is moved downward to select a smaller sample of adjustable size.

A sample size adjustment collar 64 includes a knurled flange 66 above the top of the handle portion 16. A sleeve portion 68 of the collar 64 is received in the upper end of the handle portion 16, and is keyed for axial sliding movement and simultaneous rotation to a head portion 70 of the upper stop member 58. The head portion 70 contains a journal 72 slideably supporting the plunger shaft 48. The sleeve portion 68 is slightly tapered and in it illustrated lowermost position is wedged and locked in a fixed position within the handle 16. To change the sample size, the user axially lifts the flange 66 to free the collar 64 for rotation. Then the user turns the flange 66 to rotate the collar 64. Because the collar 64 is keyed to the upper stop member 58, the stop member 58 is also rotated. The threaded shaft 60 turns in the nut 62 and the upper stop member moves axially to a position determining the desired sample size. A further description of the structure and operation of the locking adjustment collar 64 may be found in U.S. Pat. No. 5,650,124, incorporated herein by reference.

A display 72 provides an indication to the user of the selected sample size. The display includes three rings carrying numeric indicia 74, a units ring 76, a tens ring 78 and a hundreds ring 80. Indicia 74 are viewed through a window 82 provided in the handle portion 16. The units ring 74 is keyed to rotate with the upper stop member 58, and the rings 76, 78 and 80 are interconnected by a drive assembly 84 so that a sample size indication is presented at the window 82.

Figure 1:
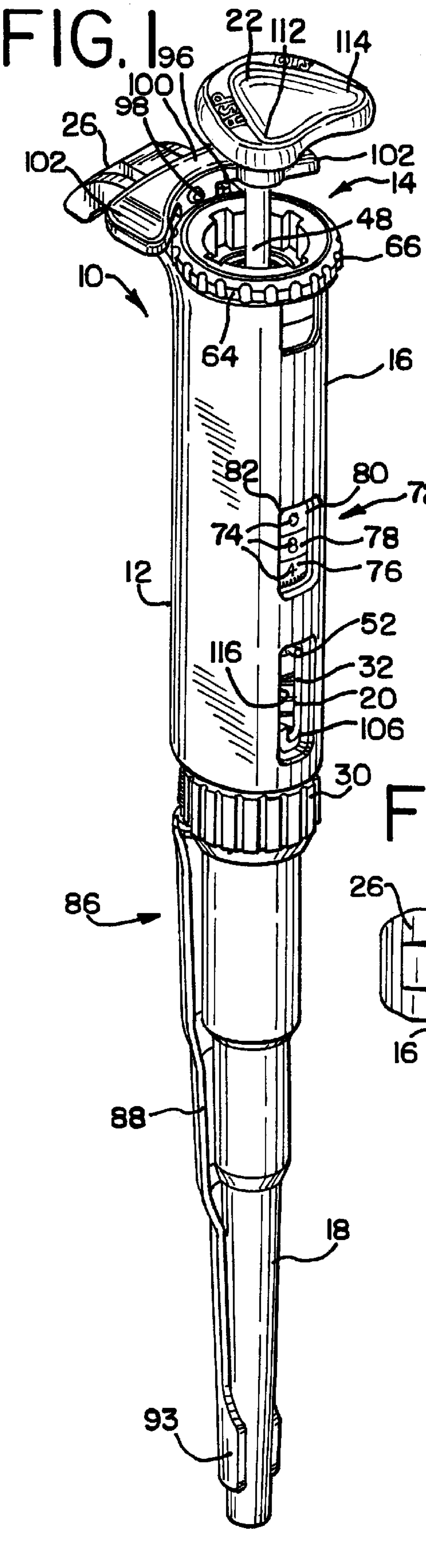
FIG. 1 is an isometric view of a pipette embodying the present invention.
Figure 2:
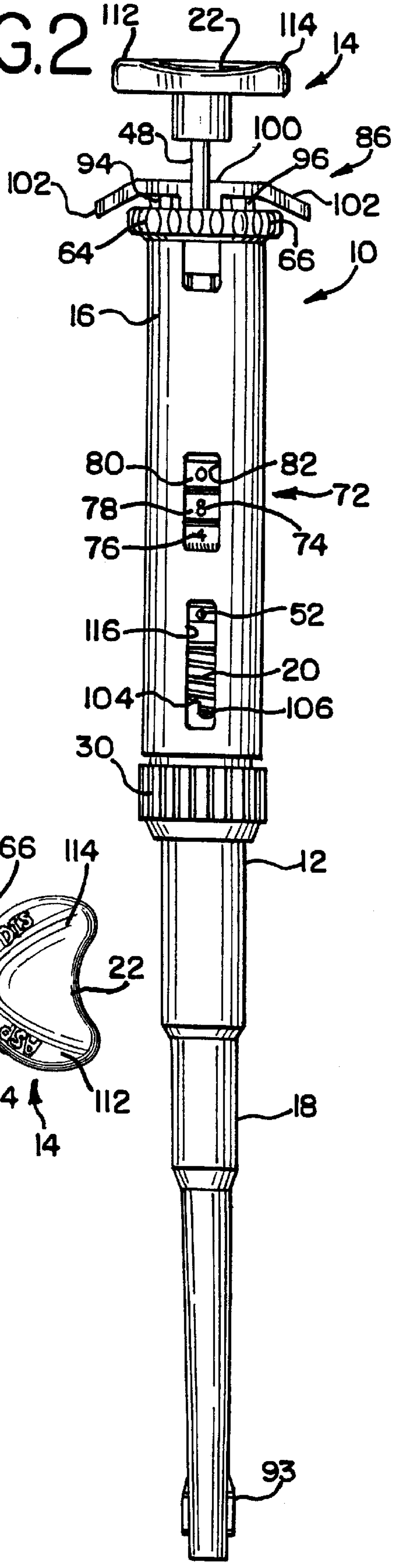
FIG. 2 is a front view of the pipette of FIG. 1.
Figure 3:
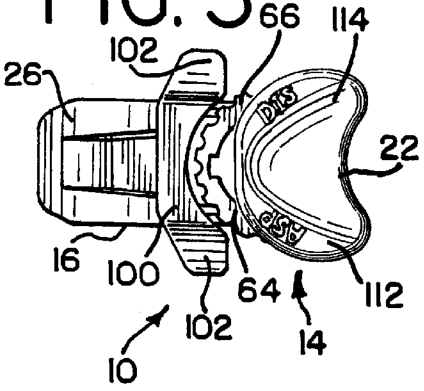
FIG. 3 is a top view of the pipette of FIG. 1.
Figure 4:
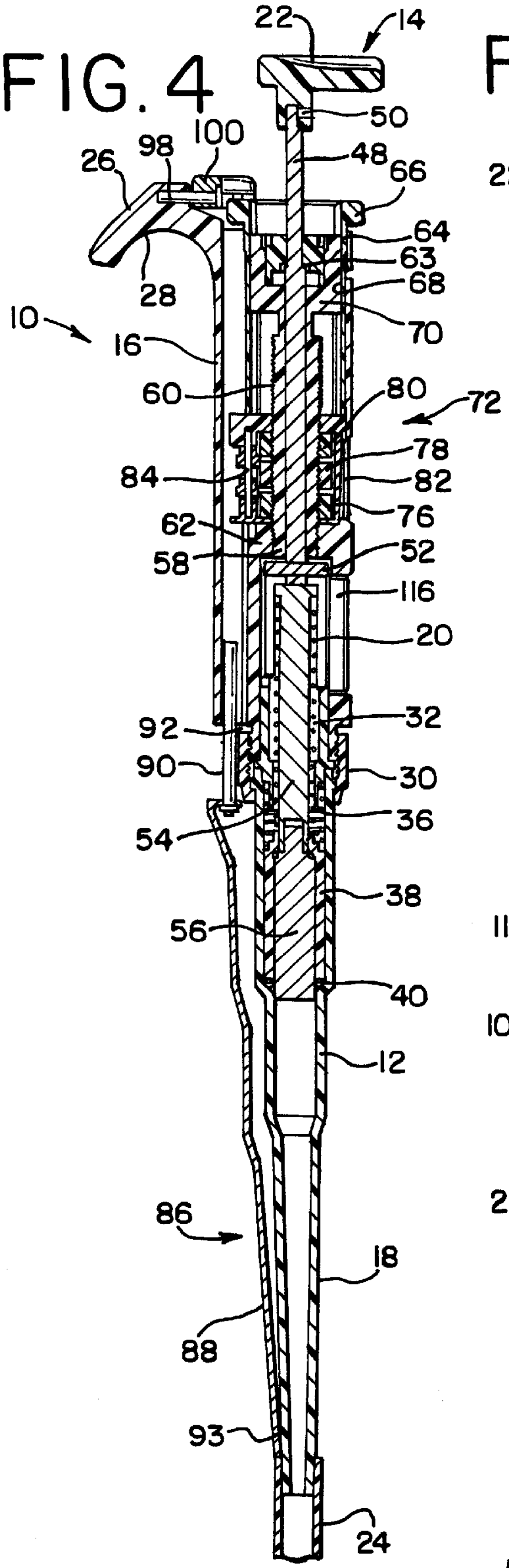
FIG. 4 is a sectional view of the pipette taken along the line 4-4 of FIG. 2.
Figure 5:
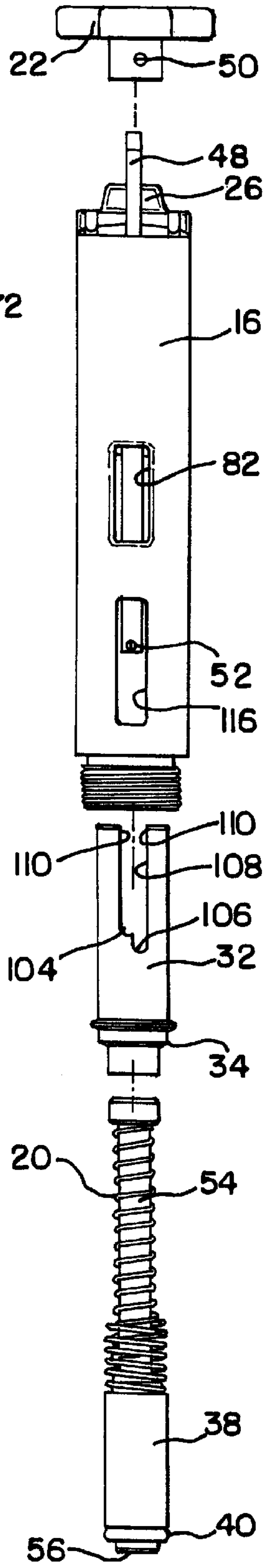
FIG. 5 is an exploded front view of certain components of the pipette.

A tip ejection mechanism generally designated as 86 is used to remove the disposable tip 24 after each sample transfer operation. The mechanism 86 includes a lower ejector member 88 mounted for axial movement on the lower body portion 18. A threaded shaft 90 connects the top of the ejector member 88 to an axially movable, generally U-shaped drive member 92 mounted within the handle portion 16 of the body 12., A lower sleeve 93 at least partially encircles the lower portion of the lower body portion 18 adjacent to the upper edge of a tip 24 mounted on the base (FIG. 4). The drive member 92 has spaced apart aims 94 and 96 terminating at spaced apart locations near the top of the handle portion 16. A pivot pin 98 is carried by the lip 26 of the handle portion 16, and pivotally supports an actuating lever 100 including a pair of similar button portions 102 located at opposite sides of the pivot pin 98. The upper portions of the aims 94 and 96 bear against the underside of the lever 100 at opposite sides of the pivot pin 98.

To eject a tip 24 from the lower body portion 18, the user presses one of the button portions 102. The lever 100 pivots and pushes one of the aims 94 or 96 to force the drive member 92 axially downward. The drive member 92 in turn forces the ejector member 88 down and the lower edge of the sleeve 93 engages the upper edge of the tip 24, pushing it out of frictional engagement with the lower body portion 18. The abrupt release of the frictional holding force causes the tip 28 to quickly move free of the base 26. The lever 100 provides a mechanical advantage as compared with mechanisms where the user presses axially on a button attached to the end of an actuator rod. The resulting increase in ejection force is an advantage especially when a tip 24 is frictionally held tightly in place.

The location of the button portions 102 at opposite sides of the handle axis makes it easy and natural for the user to apply the tip ejection force with the thumb. Because the lever 100 includes two button portions 102, the user can operate the ejection mechanism 86 by pressing a button portion 102 at either end of the lever 100. The arrangement accommodates both right and left handed users, and also permits the user to select the more comfortable side or to vary the tip ejection motion to reduce fatigue. A further description of the tip ejector mechanism 86 beyond that helpful to an understanding of the present invention may be found in pending U.S. patent application Ser. No. 09/373,488 filed on Aug. 12, 1999, incorporated herein by reference.

In accordance with the present invention, the guide sleeve 32 includes first and second lower plunger stops 104 and 106 that are both axially and circumferentially spaced form one another. More specifically, a pair of similar guide slots 108 are provided in the wall of the guide sleeve 32. The slots 108 are symmetrical with respect to the central longitudinal axis of the pipette 10 and the plunger assembly 14. Each slot 108 defines the stops 104 and 106 at stepped locations at the bottoms of the guide slots 108. The stops 104 are located above and to the side of the stops 106.

The stop engaging pin 52 extends to both sides of the plunger shaft 48 and is received in both of the guide slots 108. When the plunger assembly 14 including the plunger shaft 48 and the pin 52 is moved downwardly, its downward movement is limited by engagement of the pin 52 with either the upper stops 104 or the lower stops 106. The plunger shaft 48 can be rotated around its axis, with the amount of rotation being limited by engagement of the pin 52 with side walls 110 of the slots 108. As a result the pin 52 is always aligned with either the upper stops 104 or with the lower stops 106. The upper stops 104 are used to provide a relatively shorter axial stroke for aspiration of a liquid sample into the tip 24, and the lower stops 106 are used to provide a relatively longer axial stroke for dispensing a liquid sample from the tip 24.

The thumb button 22 is provided with a special noncircular shape to assist the user in easily and reliably selecting either an aspiration stroke or a dispensing stroke of the plunger assembly 14. Button 22 is symmetrical around a front to rear plane coinciding with the axis of the plunger assembly 14, and includes a pair of similar lobes 112 and 114 located at opposite sides of the plunger shaft 48 and plunger assembly axis. The lobes 112 and 114 are pressed downward by the user during aspiration and dispensing strokes respectively. The radial distance between the lobes 112 and 114 and the plunger shaft axis results in a torque around the axis when the thumb button 22 is pressed. As a result, when the user presses down on-either lobe 112 or 114 to move the plunger assembly 14 downward, the thumb of-the user also and simultaneously applies a rotational force to the plunger assembly. Indicia "ASP" for aspirate and "DIS" for dispense are carried by the lobes 112 and 114 to assist the user in selecting either an aspirating or a dispensing stroke.

When lobe 112 is pressed, a clockwise moment is applied to the plunger assembly 14 and the stop engaging pin 52 is aligned with the uppermost lower stops 104. As a result, as the button 22 is pressed downwardly, the pin 52 engages stops 104 to provide a relatively shorter aspirating axial stroke length. Conversely, when lobe 114 is pressed, a counterclockwise moment is applied to the plunger assembly 14 and the stop engaging pin 52 is aligned with the lowermost lower stops 106. As a result, as the button 22 is pressed downwardly, the pin 52 engages stops 106 to provide a relatively longer dispensing axial stroke length. To further assist the user in selecting the intended stroke, a window 116 may be provided in the handle portion 16 to permit a view of the pin 52 and one of the guide slots 108. This permits the user to immediately understand the nature and function of the mechanism for alternating aspirating and dispensing strokes.

Because of the lobes 112 and 114 and indicia thereon, and the presence of the window 116, the operation of the pipette 10 in achieving aspirating and dispensing strokes is apparent to the user and easily understood. Therefore the need for training and a high level of user skill is reduced. The stops 104 and 106 provide solid and positive, easily detected limits to the aspirating and dispensing strokes, and there is no need for the user to detect more subtle limits such as provided by different spring forces. Elimination of the requirement that the user overcome a relatively large spring force during the dispensing stroke reduces user fatigue, and the operation of the pipette 10 is very smooth. In addition, because the seal spring 36 is not compressed by axial plunger motion, it can be tailored to optimize the sealing effect, and there is no tendency for the seal 42 to be overstressed. Fatigue is also reduced by the fact that the user's thumb motion and position are different for aspirating and dispensing strokes.

While the present invention has been described with reference to the details of the embodiment of the invention shown in the drawing, these details are not intended to limit the scope of the invention as claimed in the appended claims.

What is claimed is:

1. A pipette for aspirating and dispensing liquid samples, said pipette comprising:

an elongated body having a longitudinal axis, said body having an upper handle portion and a lower portion, said body defining a cylinder communicating with said lower portion;

a plunger assembly axially movable in said body;

said plunger assembly including a piston movable axially in said cylinder away from said lower portion to aspirate a liquid sample and toward said lower portion to dispense a liquid sample;

an upper stop engageable with said plunger assembly and defining an upper position;

a stop structure fixed to said body and including first and second lower stops engageable with said plunger assembly and defining first and second discrete lower positions of said piston assembly; said first and second lower stops being spaced apart axially and circumferentially relative to said axis;

a return spring connected between said body and said plunger assembly biasing said plunger assembly upward toward said upper position;

said plunger assembly including an axially extending operating shaft for moving said plunger assembly downward to one of said lower positions;

said plunger assembly including a radially extending and rotatably mounted stop engaging portion, said stop engaging portion being rotatable in a first direction for engagement with said first lower stop to define a relatively shorter aspiration stroke of said plunger assembly, and said stop engaging portion being rotatable in a second direction for engagement with said second lower stop to define a relatively longer dispensing stroke of said plunger assembly.

2. A pipette as claimed in claim 1, said stop engaging portion extending radially from said shaft, and said shaft being mounted for both axial and rotational movement relative to said body.

3. A pipette as claimed in claim 2, said shaft extending upwardly from said handle portion to the exterior of said body, and a thumb button mounted on the end of said shaft for moving said shaft axially and for rotating said shaft in said first and second directions.

4. A pipette as claimed in claim 3, said button being noncircular and including first and second lobes located at opposite sides of said axis for selecting the direction of rotation of said shaft.

5. A pipette as claimed in claim 2, further comprising a sleeve mounted in said body and surrounding said shaft, and a slot in said sleeve receiving and constraining said stop engaging portion, said slot having a stepped bottom defining said first and second lower stops.

6. A pipette as claimed in claim 5, said elongated body including a window exposing said stepped bottom and said stop engaging portion.

7. A pipette as claimed in claim 5, said plunger assembly including a pair of said stop engaging portions symmetrical about said axis, and said sleeve including a pair of said slots symmetrical about said axis.

8. A pipette as claimed in claim 1, further comprising an upper member carried by said body and defining said upper stop, said upper member being axially adjustable to move said upper stop and simultaneously vary both said aspiration stroke and said dispensing stroke.

9. A pipette as claimed in claim 8, said upper member being threaded in said body, and an adjuster member connected to said upper member and being rotatably mounted at the top of said handle portion.

10. A pipette as claimed in claim 1, said lower portion of said body being attached to the lower end of said handle portion by a nut, a seal member within said lower portion, and an additional spring in compression between said handle portion and said seal member for applying a compressive sealing force to said seal member.

11. A pipette as claimed in claim 1, said handle portion supporting a tip ejector means for ejecting a removable sample containing tip from said lower portion.

* * * * *